Feb. 10, 1931.  R. F. LIPFORD  1,791,729
TRAIN CONTROL
Filed July 18, 1929   2 Sheets-Sheet 1
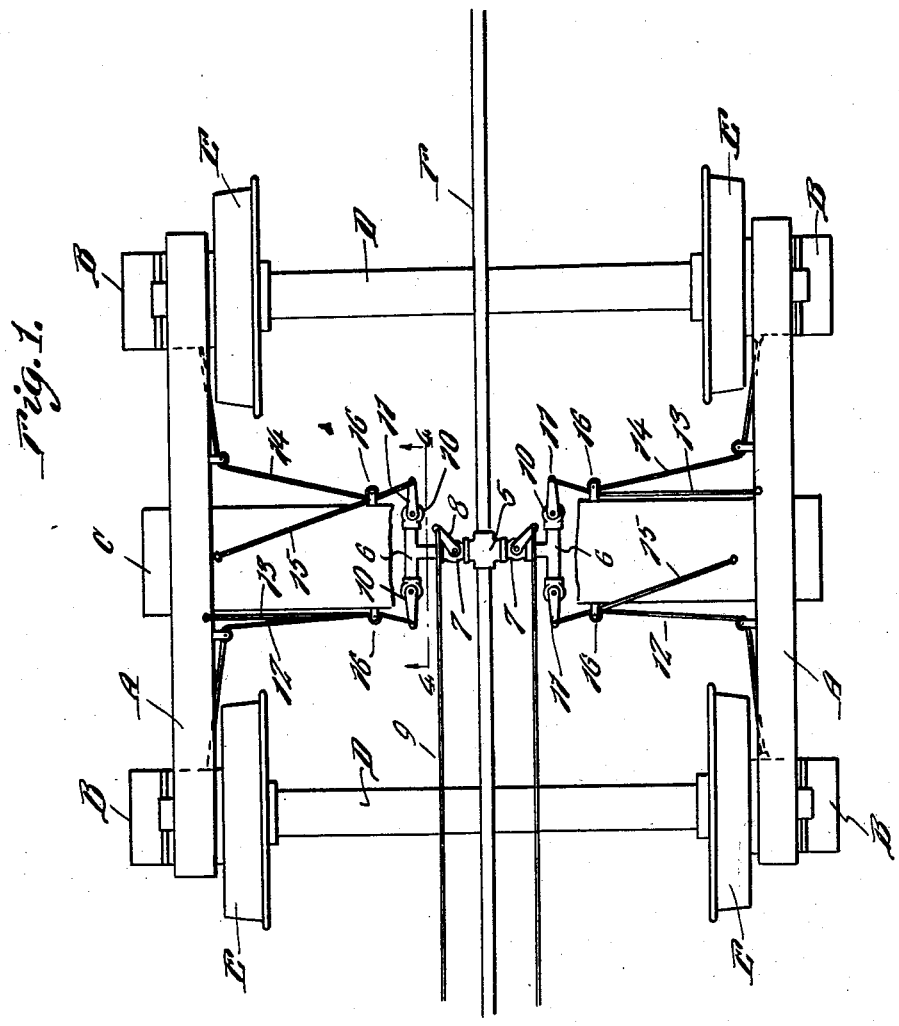
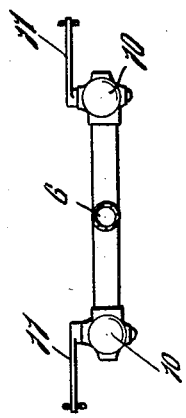
Inventor
R. F. Lipford
By Clarence A. O'Brien
Attorney

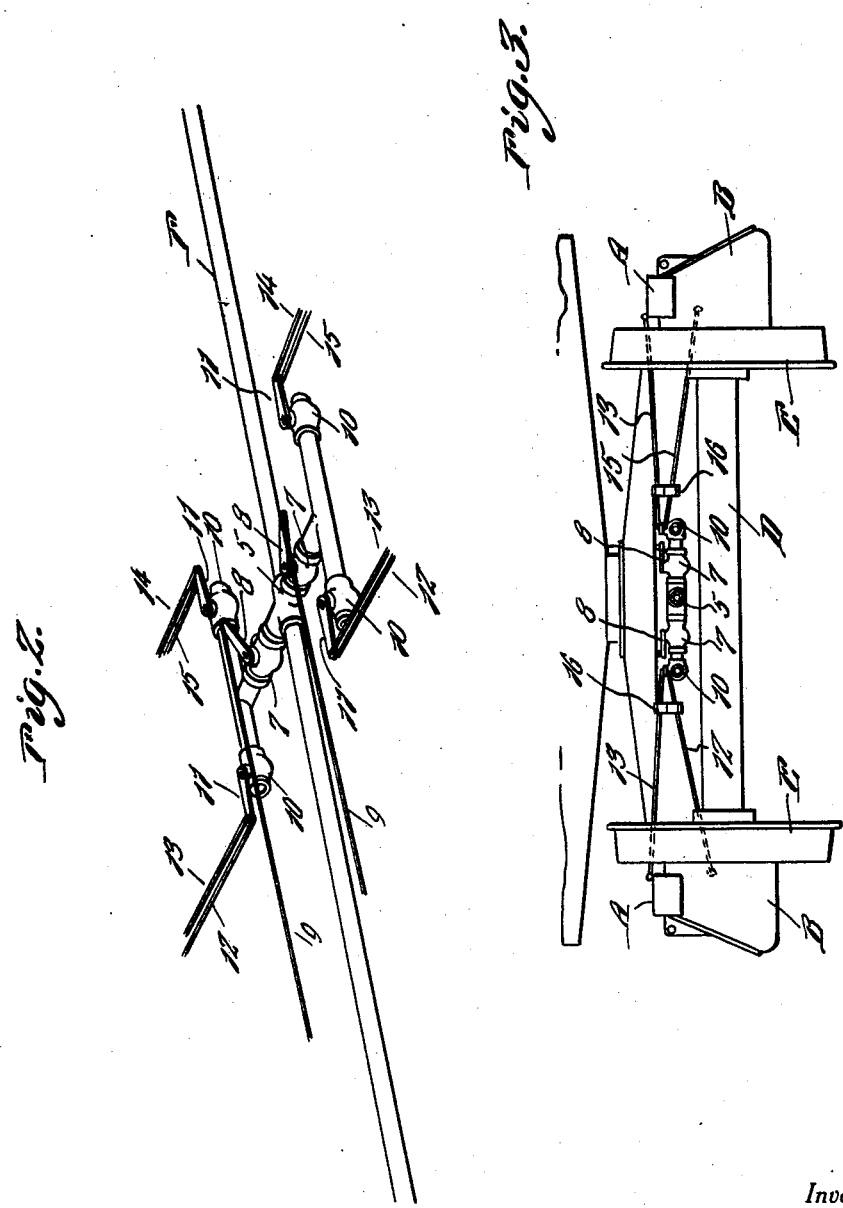

Patented Feb. 10, 1931

1,791,729

UNITED STATES PATENT OFFICE

ROBERT FRANKLIN LIPFORD, OF HANDLEY, WEST VIRGINIA

TRAIN CONTROL

Application filed July 18, 1929. Serial No. 379,258.

The present invention relates to new and useful improvements in automatic train control and more particularly to a novel brake actuating mechanism operable in the event the train becomes derailed, a journal burns down, a bolt drops, or in fact in numerous other emergencies.

The principal object of the invention is to provide an automatic brake control which while being automatic in operation will not be convenient for actuation by persons unauthorized to operate the same.

Another important object of the invention is to provide a train control of the character mentioned, which will be relatively cheap to install on present day types of rolling stock.

These and numerous other important objects and advantages of the invention will become more apparent to the reader after considering the invention as described and claimed hereinafter.

In the drawings:

Figure 1 represents a top plan view showing one truck of a railway car with the usual brake mechanism removed and disclosing the arrangement of the parts of the present invention.

Figure 2 represents a perspective view showing the novel valve arrangement and the actuating cables leading therefrom.

Figure 3 is a fragmentary and elevation of the truck disclosing the novel valve arrangement and the cables connecting the dislocatable parts.

Figure 4 represents a vertical sectional view taken substantially on line 4—4 of Figure 1.

Referring to the drawings, wherein like numerals designate like parts, it will be seen that the drawings disclose the invention applied to one truck structure of a railway car, and it is to be understood that this invention is to be installed on every truck of a train of cars. Briefly the truck construction includes the frame A—A, each of which has a journal B at each end. The bolster C projects at its ends through the frame A—A in the manner shown or in fact any conventional manner, it being understood that these parts are standard, although the invention may be adapted for use with modified forms of truck constructions without departing from the spirit and scope of the invention as claimed hereinafter.

The axles D—D have their ends disposed through the journals B and each axle is provided with a pair of flanged wheels E—E. The usual brake airline F extends across the truck in the manner shown in Figure 1 and in this invention the pipeline is broken by a cross fitting 5. A T-fitting 6 is provided at each side of the airline F and is connected to the cross fitting 5 through the medium of a valve structure 7. Each valve structure 7 is provided with a lever 8 for actuating its valve member and the control line 9 extends from this lever to a point where the same can be actuated manually.

The remaining ends of each fitting 6 have a valve 10 installed thereon for normally maintaining the same closed. Each of these valves 10 has a valve element therein operable by the lever. The valves 10 of each T-fitting are connected in the manner shown in Figure 1. One valve 10 has a cable 12 extending from its lever 11 to one of the journals B while another cable 13 extends from the same lever to the truck frame A. The lever 11 of the other valve 10 has a cable 14 extending therefrom for connection to the other journal on the same side of the strut, while the cable 15 extends from the said lever for connection to the bolster B adjacent the end nearest the aforementioned journals. The cables 12, 13, 14 and 15 are trained across pulleys 16, which may be of any suitable type.

I claim:

A train control device comprising a car truck including the frame, bolsters and journals of an air brake line extending longitudinally and centrally of the truck, a cross fitting in said line, a plurality of air outlets having normally closed control valves disposed on opposite sides of said air line and connected with said cross fitting, a plurality of paired valve operating cables mounted on the frame and bolsters of said car truck respectively, said cables being trained over said pairs of pulleys with their respective outer ends attached to the journals of the car truck, certain of said cables being attached at their inner ends to the said bolsters and the remaining cables being attached to the truck frame, said cables being connected between their attached ends to the said control valves of the said air outlet.

In testimony whereof I affix my signature.

ROBERT FRANKLIN LIPFORD.